(12) United States Patent
Wong (10) Patent No.: US 10,111,054 B2
(45) Date of Patent: Oct. 23, 2018

(54) APPARATUS AND METHOD FOR PERFORMING FEEDBACK REDUCTION

(71) Applicant: SYMBOL TECHNOLOGIES, INC., Schaumburg, IL (US)

(72) Inventor: William Yat Lam Wong, Douglaston, NY (US)

(73) Assignee: Symbol Technologies, LLC, Holtsville, IL (US)

( * ) Notice: Subject to any disclaimer, the term of this patent is extended or adjusted under 35 U.S.C. 154(b) by 0 days.

(21) Appl. No.: 14/502,140

(22) Filed: Sep. 30, 2014

(65) Prior Publication Data

US 2016/0094960 A1 Mar. 31, 2016

(51) Int. Cl.
| H04L 5/16 | (2006.01) |
| H04W 4/00 | (2018.01) |
| H04W 4/10 | (2009.01) |
| H04L 5/00 | (2006.01) |
| H04W 4/80 | (2018.01) |

(52) U.S. Cl.
CPC ............. H04W 4/10 (2013.01); H04L 5/0069 (2013.01); H04L 5/16 (2013.01); H04W 4/80 (2018.02)

(58) Field of Classification Search
CPC .......... H04L 5/16; H04B 15/00; H04B 7/0421
USPC ..................................... 370/286; 379/388.03
See application file for complete search history.

(56) References Cited

U.S. PATENT DOCUMENTS

| 4,847,829 | A  | * | 7/1989 | Tompkins | ............. | H04M 3/561 |
|           |    |   |        |          |              | 370/260 |
| 5,390,341 | A  |   | 2/1995 | Ziniel |              |  |
| 7,224,702 | B2 | * | 5/2007 | Lee | ....................... | H04L 1/1809 |
|           |    |   |        |          |              | 370/473 |
| 8,326,228 | B2 |   | 12/2012 | Lewis |           |  |
| 8,630,426 | B2 |   | 1/2014 | Svendsen |           |  |
| 8,667,168 | B2 |   | 3/2014 | Ryu |              |  |
| 2001/0036174 | A1 | * | 11/2001 | Herring | ................. | H04W 76/15 |
|              |    |   |         |         |                | 370/352 |
| 2002/0106017 | A1 | * | 8/2002 | Dombkowski | ........ | H04B 14/04 |
|              |    |   |         |            |        | 375/238 |
| 2006/0240840 | A1 | * | 10/2006 | Morgan | .................... | G01S 5/02 |
|              |    |   |         |        |                     | 455/456.1 |
| 2008/0147392 | A1 | * | 6/2008 | Shaffer | ............... | G10L 21/0208 |
|              |    |   |         |         |                | 704/233 |

(Continued)

FOREIGN PATENT DOCUMENTS

| EP | 2671406 A2 | 12/2013 |
| GB | 2490312 A | 10/2012 |

*Primary Examiner* — Asad M Nawaz
*Assistant Examiner* — Jason A Harley (57) ABSTRACT

A method and system for enabling feedback reduction for half-duplex communications is provided. In operation, a crossing of a proximity threshold between a first device and a second device is determined and a feedback reduction operation is enabled based on the determination. The determination is based on a proximity check based on a near field proximity profile. The feedback reduction operation is at least one of reducing a playback volume to a predetermined level and delaying a playback. To delay playback, when a device enters transmit-mode, it may delay the transmission of received voice input. To reduce the playback volume, when a device enters receive-mode, it may reduce a volume of the audio output apparatus to a predetermined level.

16 Claims, 7 Drawing Sheets

(56) References Cited

U.S. PATENT DOCUMENTS

| | | | |
|---|---|---|---|
| 2010/0014687 A1* | 1/2010 | Blaszczynski | H04N 5/775 381/86 |
| 2010/0151787 A1* | 6/2010 | Contreras | H04B 1/44 455/41.2 |
| 2012/0051330 A1* | 3/2012 | Monnes | H04W 4/10 370/335 |
| 2014/0119274 A1 | 5/2014 | Uwamori | |
| 2014/0269531 A1* | 9/2014 | Luna | H04W 72/00 370/329 |
| 2015/0105117 A1* | 4/2015 | Larson | H04M 1/6058 455/518 |
| 2015/0358666 A1* | 12/2015 | Atake | H04N 21/4122 725/88 |

\* cited by examiner

APPARATUS AND METHOD FOR PERFORMING FEEDBACK REDUCTION

BACKGROUND OF THE INVENTION

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speakers. In situations where using a PTT button may not be feasible or convenient, a voice operated command may be employed to switch a device into the transmit-mode.

In high density environments where devices are within close proximity of each other, and especially in multicast situations where a transmission is received at multiple different devices, feedback may be introduced into the PTT communications. For example, when a communication device which is in a transmit-mode is within the vicinity of a receive-mode communication device, the playback from the receive-mode communication device's speaker may be received as input by the microphone of the transmit-mode device, causing acoustic feedback. Acoustic feedback may degrade voice transmission and playback, and at extreme situations, may make the devices unusable for PTT communication.

Acoustic feedback problems are typically mitigated by using acoustic echo cancellation based on digital signal processing to "remove" or attenuate certain components from the audio stream or to shift certain acoustic frequency ranges. However, these solutions are typically designed for full-duplex telephony systems and are not effective for half-duplex PTT communications. In a full-duplex system, acoustic feedback happens when the audio output of a device is fed back into the audio input of the same device. In a half-duplex system, acoustic feedback happens when the audio output of a device is fed back into the audio input of another device transmitting on the same channel. Inter-device acoustic feedback introduces unpredictable delay and jitter which significantly reduces the effectiveness of acoustic echo cancellation. Accordingly, there is a need for an improved system and method for reducing feedback in PTT communications.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method and system for enabling feedback reduction for half-duplex communications is provided. In operation, a crossing of a proximity threshold between a first device and a second device is determined and a feedback reduction operation is enabled based on the determination. The determination is based on a proximity check based on a near field proximity profile. The feedback reduction operation is at least one of reducing a playback volume to a predetermined level and delaying a playback. To delay playback, when a device enters transmit-mode, it may delay the transmission of received voice input. To reduce the playback volume, when a device enters receive-mode, it may reduce a volume of the audio output apparatus to a predetermined level.

Figure 1:
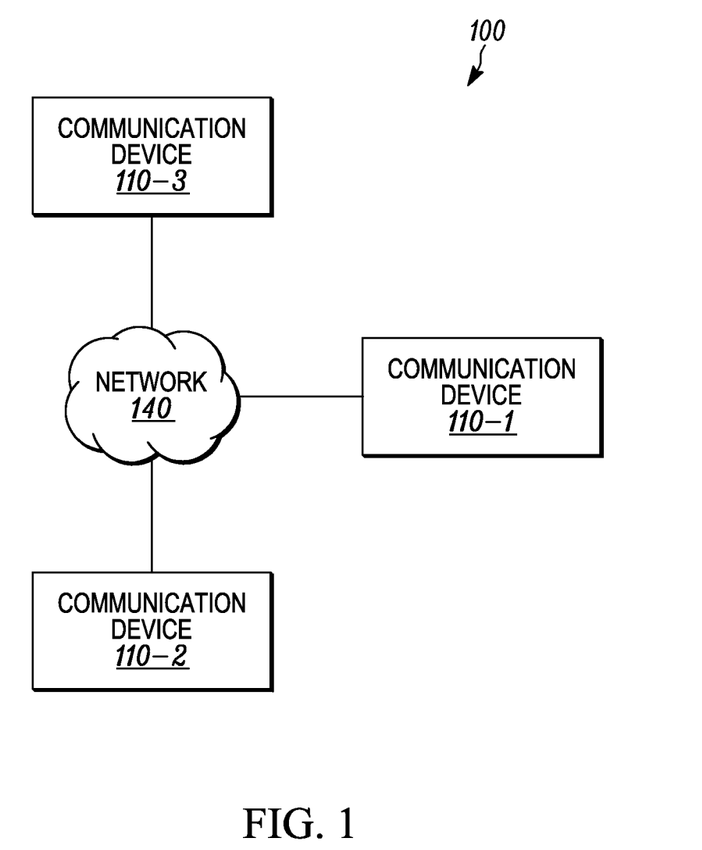
FIG. 1 is a block diagram of an example push-to-talk (PTT) system in accordance with some embodiments.

FIG. 1 is a block diagram of a PTT system 100 in which methods and components required for performing processes associated with feedback reduction is implemented in accordance with the embodiments. The PTT system 100 includes three communication devices 110-1, 110-2 and 110-3 in communication with one another through a network 140. Collectively, the communication devices 110-1, 110-2 and 110-3 are referred to as the communication devices 110, and generically as the communication device 110. This nomenclature is used elsewhere herein.

Although the PTT system 100 includes three communication devices 110, it is to be understood by persons of skill that in variations, the number of devices included may change. In further variations, the communication devices 110 may communicate with each other directly without the aid of the network 140.

The communication devices 110 may be any device capable of PTT voice communications. For example, the communication devices 110 may be computing devices capable of voice communications. Alternatively, the communication devices 110 may be dedicated voice communication devices. The communication devices 110 may take the form of wearable devices such as body or head mounted devices, vehicle mounted devices, handheld devices such as a smartphone, a tablet, a feature phone, a walkie-talkie and the like, a data capture terminal connected to a handheld device, a desktop, a vehicle mounted device, a laptop or a notebook computer, a desktop computer, a point of sale device and the like. Embodiments may be advantageously implemented to perform feedback reduction using the PTT system 100.

Figure 2:
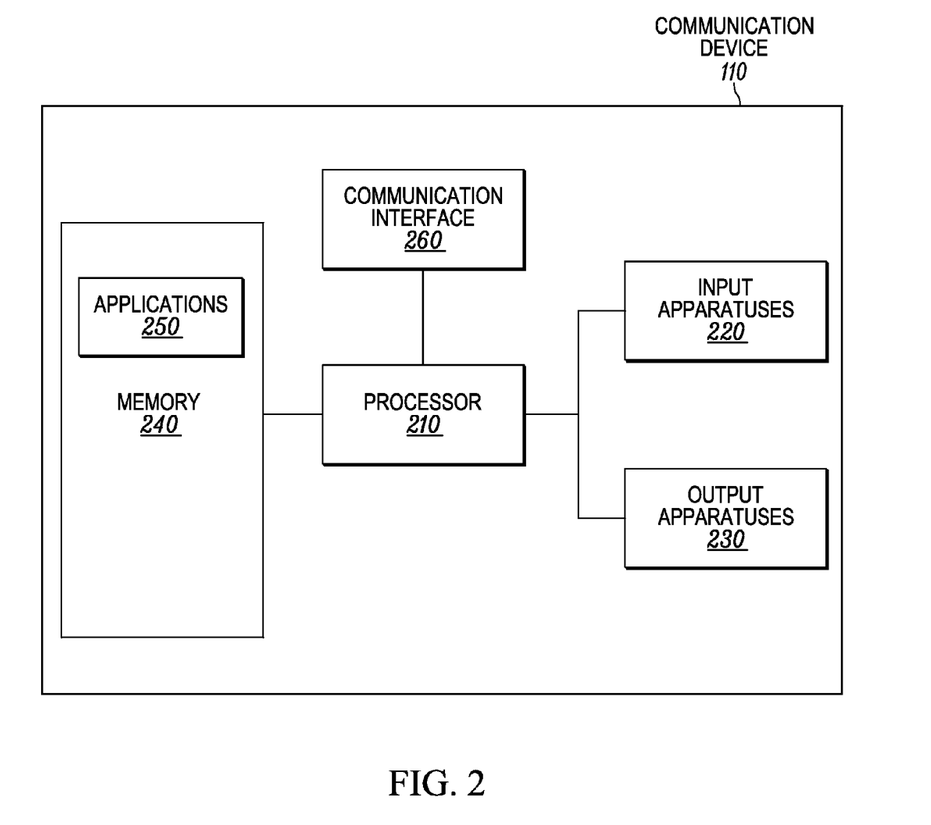
FIG. 2 is a block diagram of a communication device for use in the PTT system of FIG. 1 in accordance with some embodiments.

Referring to FIG. 2, the internal components of the communication device 110 is shown as a block diagram, in accordance with an example implementation. According to FIG. 2, the communication device 110 comprises a processor 210, one or more input apparatuses 220, one or more output apparatuses 230 and a memory 240. The processor 210 runs or executes operating instructions or applications that are stored in the memory 240 to perform various functions for the communication device 110. The processor 210 includes one or more microprocessors, microcontrollers, digital signal processors (DSP), state machines, logic circuitry, or any device or devices that process information based on operational or programming instructions stored in the memory 240. In accordance with the embodiments, the processor 210 processes various functions and data to carry out PTT voice communications.

The input apparatuses 220 are any apparatuses which allow the communication device 110 to receive input from an operator. For example, the input apparatuses 220 may be a dedicated PTT button, a keyboard, a touch pad, a touch component of a display, an audio input apparatus such as a microphone which can be used to receive voice activated commands or voice input to be transmitted, sensors for detecting gestures, buttons, switches or other apparatuses which may be used to receive operator input. In variations, combinations of such apparatuses may be used.

The output apparatuses 230 are any apparatuses capable of providing feedback to an operator. Accordingly, the output apparatuses 230 may be in the form of, for example, an audio output apparatus, such as a speaker, a haptic device such as a vibrator, or a visual apparatus such as a display or a light emitting diode (LED), or a combination of such apparatuses.

The memory 240 is any apparatus or non-transitory medium capable of storing digital information. Accordingly, the memory 240 may be an IC (integrated circuit) memory chip containing any form of RAM (random-access memory) or ROM (read-only memory), a CD-RW (compact disk with read write), a hard disk drive, a DVD-RW (digital versatile disc with read write), a flash memory card, external subscriber identity module (SIM) card or any other non-transitory medium for storing digital information. The memory 240 comprises one or more applications 250. The applications 250 include various software and/or firmware programs necessary for the operation of the device as part of the PTT system 100 as well as software and/or firmware programs (e.g. a proximity detector, a proximity profile comprising a proximity monitor and a proximity reporter, voice input encoding and decoding modules, email applications etc.) that address specific requirements of the operator.

The communications interface 260 comprises one or more interfaces allowing the communication device 110 to communicate with the network 140. The communications interface 260 implements appropriate mechanisms and protocols to allow the communication device 110 to establish PTT communications with one or more of the communication devices 110-2 and 110-3. The communications interface 260 further implements appropriate communication mechanisms and protocols to allow the device 110 to detect proximity of other communication devices such as the communication devices 110-2 and/or 110-3. In some variations, the communications interface 260 may allow communications to occur directly between the communication devices 110 without an intermediate routing through the network 140.

In accordance with some implementations, it will be appreciated that the communication interface 260 may utilize a wireless communication system, a wired communication system, a broadcast communication system, or any other equivalent communication system. For example, the wireless communication system may function utilizing any wireless radio frequency channel, for example, a one or two-way messaging channel, or a mobile radio channel. Similarly, it will be appreciated that the wireless communication system may function utilizing other types of communication channels such as Institute of Electrical and Electronics Engineers (IEEE) 802.11 (Wi-Fi™), IEEE 802.16 and/or Bluetooth™ channels. In some implementations, the wireless communication systems may be implemented as a cellular communication system based on cellular communication specifications such as global systems for mobile communications (GSM), code division multiple access (CDMA) and long-term evolution (LTE).

The network 140 may be any communications network such as a local area network (LAN) or a wide area network (WAN) or a combination. The LAN, for example, may employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or the modules. The WAN, for example, may use a physical network media such as X.25, Frame Relay, ISDN, Modem dial-up or other media to connect devices or other local area networks.

In the following description, the term "communication system" or "connection" or "communication" refers to any of the systems mentioned above or an equivalent. Embodiments may be advantageously implemented to perform feedback reduction on the PTT system 100.

PTT communications are typically performed using half-duplex operations. Accordingly, only one of the communication devices 110 may transmit at a time. The other communication devices 110 receiving the broadcast transmission are unable to transmit until the communication device 110 which is in transmit-mode switches back to a receive-mode.

When engaging in PTT communications, at least one input apparatus 220 may be used to enter one of the communication devices 110 into a transmit-mode. For example, pressing a dedicated PTT button, touching a touch button on the touch screen, or otherwise providing an input through one of the input apparatuses 220 may trigger the communication device 110 to enter into a transmit-mode. In variations, a voice activated transmission mode voice may be used to receive voice commands that may be used to trigger the communication device 110 to enter into a transmit-mode. For example, a code command such as "transmit" may be spoken to trigger the mode change.

When in a transmit-mode, the communication device 110 receives a voice input through an input apparatus 220, such as an audio input apparatus, encodes the received voice input into a format suitable for transmission through the communication interface 260 and transmits the encoded voice input through the communications interface 260. This process is typically continued until a further trigger is received indicating a switch of the communication device 110 to a receive-mode. The further trigger may be any input received through the input apparatuses 220, such as the release of the dedicated PTT button, stopping the touching of the touch sensitive button or the reception of a voice code, such as "over", through an audio input apparatus.

When the communication device 110, such as the communication device 110-1, is in a transmit-mode, at least one of the communication devices 110-2 and 110-3 may be in a receive-mode. Accordingly, one or both of the communication devices 110-2 and 110-3 may receive the encoded voice input transmitted by the communication device 110-1. The communication devices 110 in the receive-mode may subsequently decode the received transmission and play back the voice input through an audio output apparatus such as a speaker.

In some implementations, the communication devices 110 are able to discover a proximity to each other. Various mechanisms may be used to detect proximity. For example, a proximity detector maintained on a communication device 110, such as the communication device 110-1, may query a location tracking server (not shown) to receive its proximity to all other communication devices 110, in the example of FIG. 1, the communication devices 110-2 and 110-3. Locations of the communication devices 110 may be tracked based on location based technologies such as the global positioning system (GPS), cellular tower triangulation and proximity to access points.

In variations, a communication device 110 may determine its proximity to the other communication devices 110 by communicating with the other communication devices 110 directly. As an example, a proximity detector maintained on the communication device 110-1 may detect the proximity of the other communication devices 110-2 and 110-3. For example, using a near field proximity profile, such as the Bluetooth™ Low Energy (LE) proximity profiles (PXP), as the proximity detector, the communication device 110-1 may determine the proximity of the other communication devices 110-2 and 110-3 based on a strength of the received signal strength indication (RSSI) received from each communication device 110-2 and 110-3. Specifically, a proximity monitor maintained as part of the proximity profile on the communication device 110-1 may detect the radio signal broadcast from one or both proximity reporters maintained as part of the proximity profiles on the communication devices 110-2 and 110-3. The proximity monitor may then determine the proximity of each proximity reporter detected based on the (received signal strength indicator) RSSI value for that proximity reporter. Accordingly, each communication device 110 may be enabled to detect the proximity of other communication devices 110 around it by maintaining a proximity profile.

In some implementations, the detected proximity to other communication devices may trigger the enabling of one or more feedback reduction operations. For example when a communication device 110 that is in a transmit-mode, such as the communication device 110-1, comes within a predetermined distance of another communication device 110 that is in a receive-mode, such as the communication device 110-2, one or more feedback reduction operations may be enabled on either the communication device 110-1, the communications device 110-2 or both. The feedback reduction operation may be a delay of the voice input's playback at the receive-mode communication device 110 until the transmit-mode communication device 110 exits the transmit-mode, through for example, a release of the PTT button. The delay may be effected by buffering the voice input at the transmit-mode communication device 110 until the transmit-mode is exited. Alternatively, the playback delay may be effected by buffering the voice input at the receive-mode communication device 110, delaying the playback until the transmit-mode communication device 110 exits the transmit-mode. In yet other variations, the buffering may be done in part at the transmit-mode communication device 110 and in part at the receive-mode communication device 110.

In other implementations, the feedback reduction operation may be a lowering of the playback volume so as to reduce the likelihood that the playback may reach the transmit-mode communication device 110, thus reducing the likelihood of acoustic feedback formation. The volume reduction may be effected at the receive-mode communication device 110 by lowering a volume of the audio output apparatus such as the communication device 110's speaker through which the voice input is played back, to a predetermined level. In variations, the volume reduction may be achieved through digital signal processing of the voice input at the receive-mode communications device 110 to get a volume reduction to a predetermined level. Alternatively, the playback volume may be effectively lowered at the transmit-mode communication device 110 by reducing a sensitivity of the audio input apparatus from which the voice input is received, to a predetermined level. As a further alternative, the volume reduction may be achieved through digital signal processing of the voice input at the transmit-mode communications device 110 to get a volume reduction to a predetermined level. It should be noted that when the volume adjustments are made at a transmit-mode communication device 110, all the receive-mode communication devices 110 may have their playback volumes lowered. This may be problematic in a multi-cast system where there are multiple receive-mode communication devices 110, but may not be an issue when there is only one receive-mode communication device 110.

When feedback operations are enabled, additional output may be provided through at least one of the output apparatuses 230, at either the receive-mode communication device 110 or at the transmit-mode communication device 110 or both, indicating that feedback reduction operations are in effect. Such additional output may alert the operators of the communication devices against varying parameters of the communication devices 110 manually, by for example manually increasing the volume.

Figure 3:
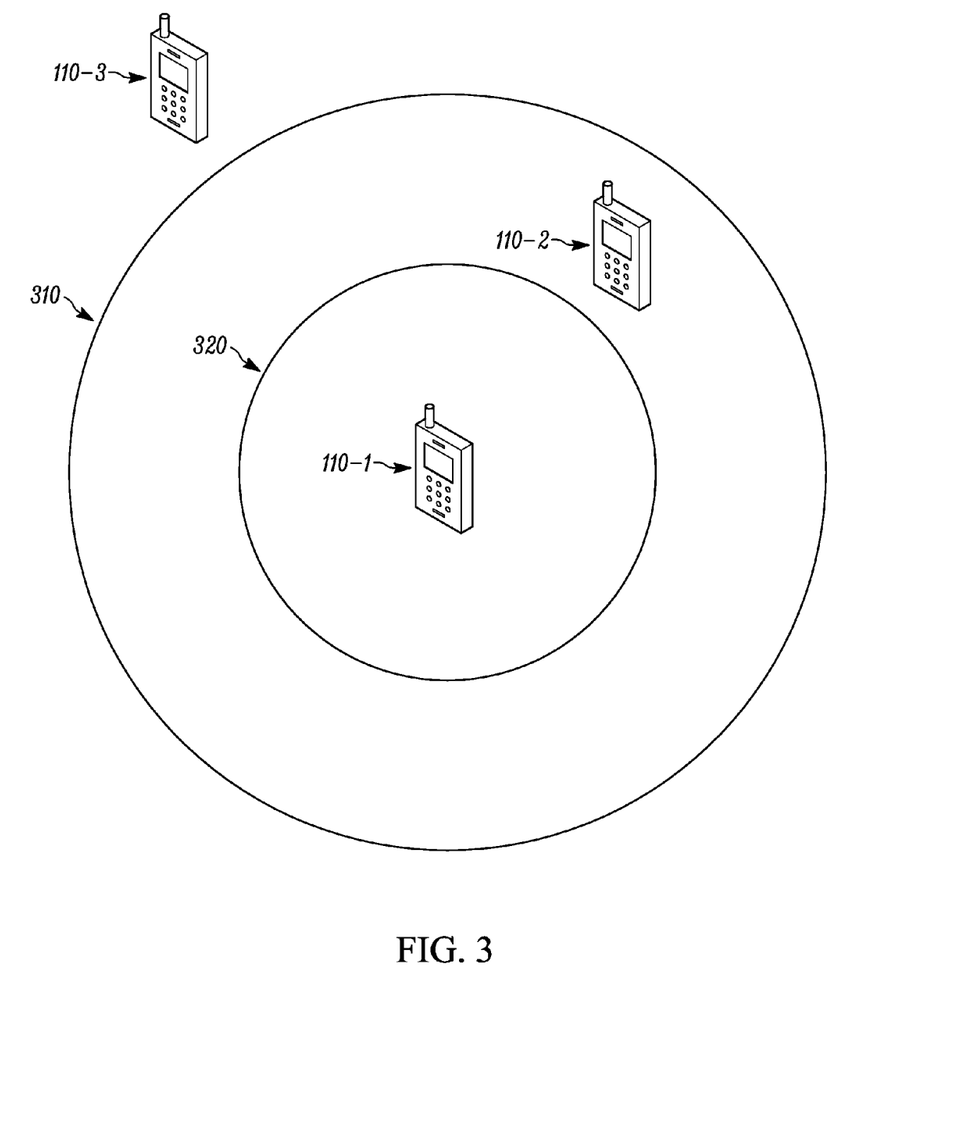
FIG. 3 is a schematic diagram indicating the relative locations of the communications devices used in the PTT system of FIG. 1 in accordance with some embodiments.
Figure 4:
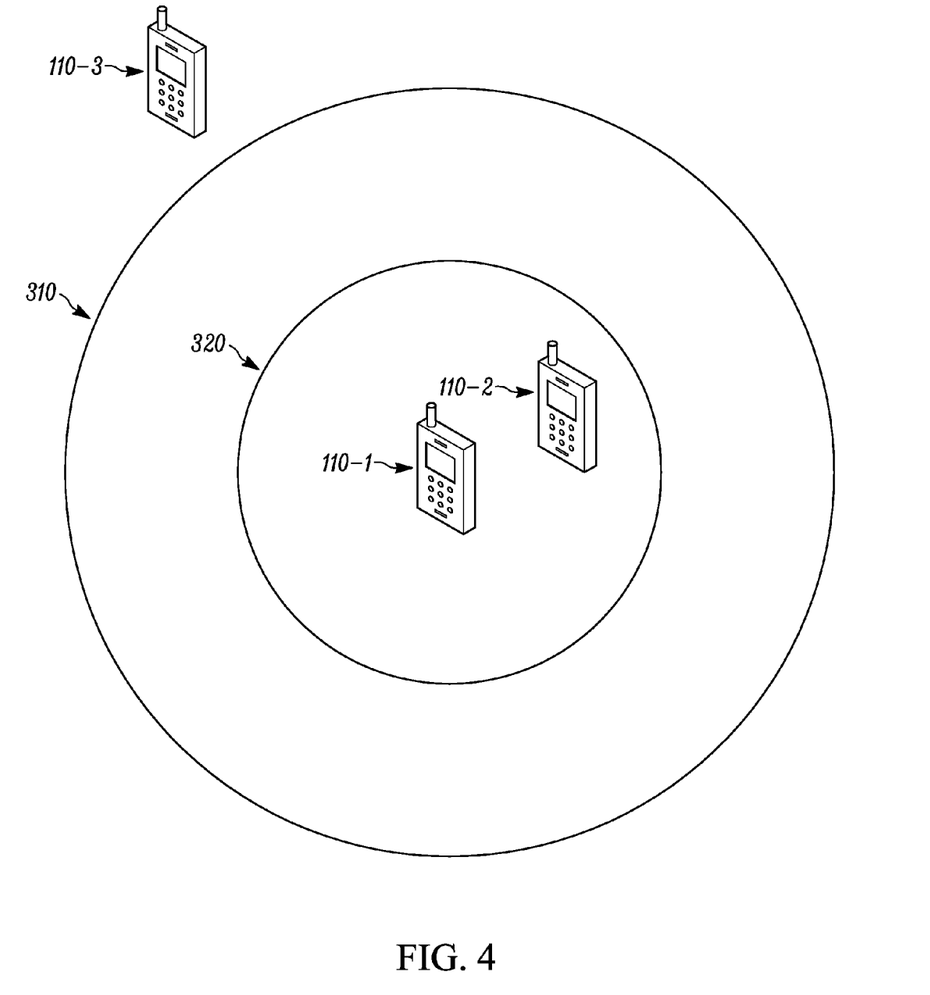
FIG. 4 is a schematic diagram indicating the relative locations of the communications devices used in the PTT system of FIG. 1 in accordance with some embodiments.

In some implementations, the feedback reduction operations may be initiated based on different predetermined proximity thresholds. For example, referring to FIG. 3, when the receive-mode communication device 110-2 crosses, or comes within, a first predetermined proximity threshold 310, the playback volume may be lowered. Referring now to FIG. 4, when the receive-mode communication device 110-2 crosses, or comes within, a second predetermined threshold 320, the second threshold 320 being smaller then first threshold 310, playback delay may be introduced, and optionally the playback volume restored to normal levels. Similarly, when the receive-mode communication device 110 once again exceeds the second predetermined threshold 320, but remains within the first proximity threshold 310, as indicated in FIG. 3, playback delay may be stopped and the playback volume reduced.

In some implementations, the feedback reduction operations may be suspended once a receive-mode communication device 110 leaves the proximity of the transmit-mode communication device 110, as defined by a proximity threshold. In variations, the feedback reduction operations may not be suspended until all of the receive-mode communication devices 110 leave the proximity of the transmit-mode communication device 110 by exceeding the predetermined proximity threshold.

Figure 5:
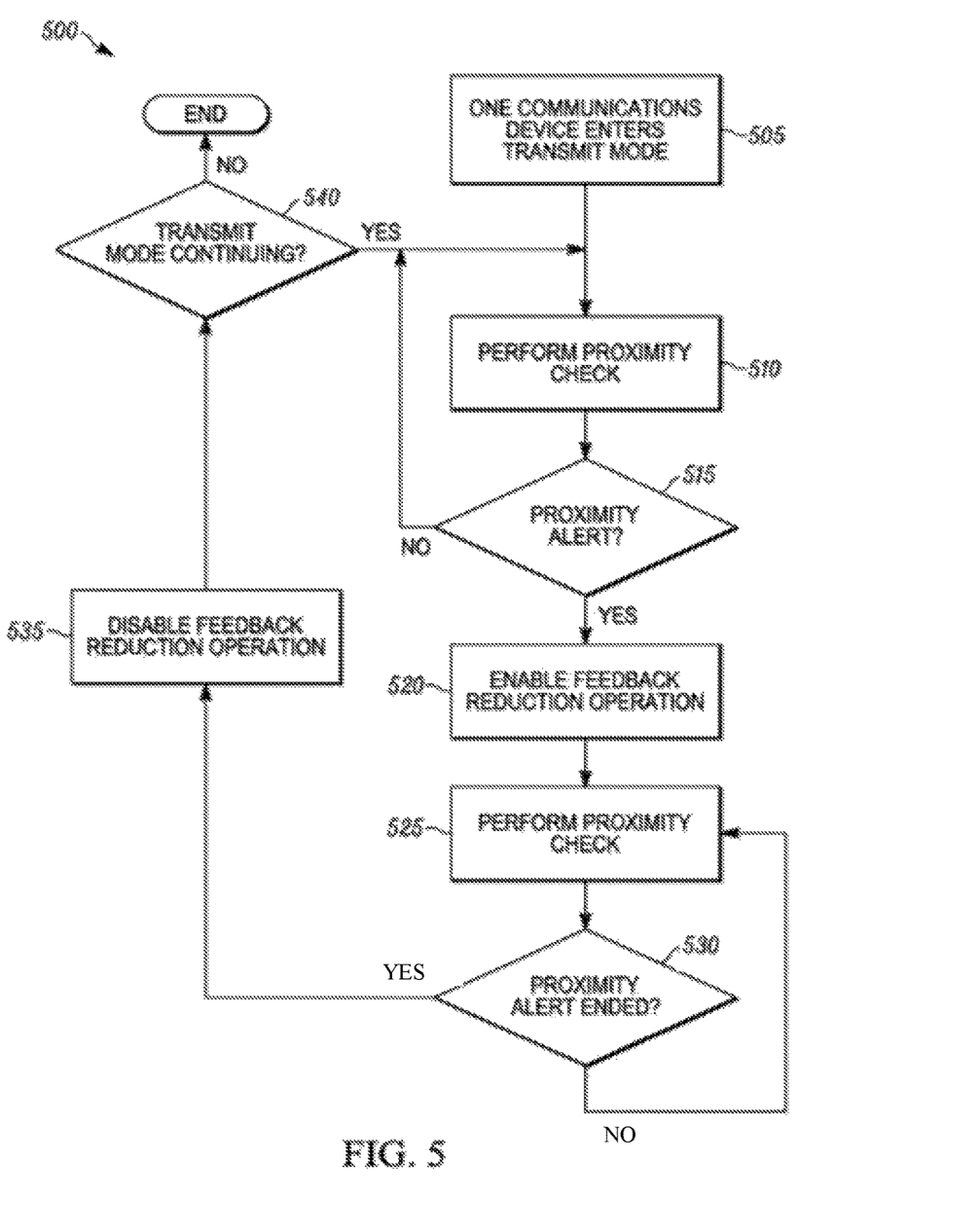
FIG. 5 is a flowchart of a method of feedback reduction in accordance with some embodiments.

FIG. 5 represents a flowchart of a method 500 for enabling feedback reduction at the PTT system 100 of FIG. 1 in accordance with some embodiments. As shown in FIG. 5, the method 500 begins by determining that one of the communication devices 110, in this example, the communication device 110-1, enters, at block 505, into a transmit-mode, by for example receiving an indication of the engagement of a dedicated PTT button.

At 510 a proximity check is performed. A proximity check may be performed by a proximity monitor of the proximity profile maintained by the communication devices 110. In some implementations, the proximity check may be performed by each receive-mode communication device 110 checking to determine whether a transmit-mode communication device 110 is within a proximity threshold. Alternatively, or in addition, a transmit-mode communication device 110 may check to determine whether any of the receive-mode communication devices 110 are within a proximity threshold. The check may be performed periodically, or in any other manner deemed appropriate, for example, when a device is determined to be in motion. In this example, the proximity check is performed based on the Bluetooth LE proximity profiles maintained by each communication device 110.

At 515 a determination is made as to whether a proximity alert is to be generated based on the proximity check. The proximity alert may be generated by the proximity monitor maintained by the communication devices 110. For example a proximity alert may be provided when, based on the proximity check, a transmit-mode and a receive-mode communication devices 110 are determined to be within a predetermined proximity threshold. In some implementations, a proximity monitor may not generate an alert, but instead provide a measure of distance based on the proximity check instead. Accordingly, a communication device 110 receiving the distance measure may determine whether any proximity thresholds are crossed based on the provided distance.

Figure 6:
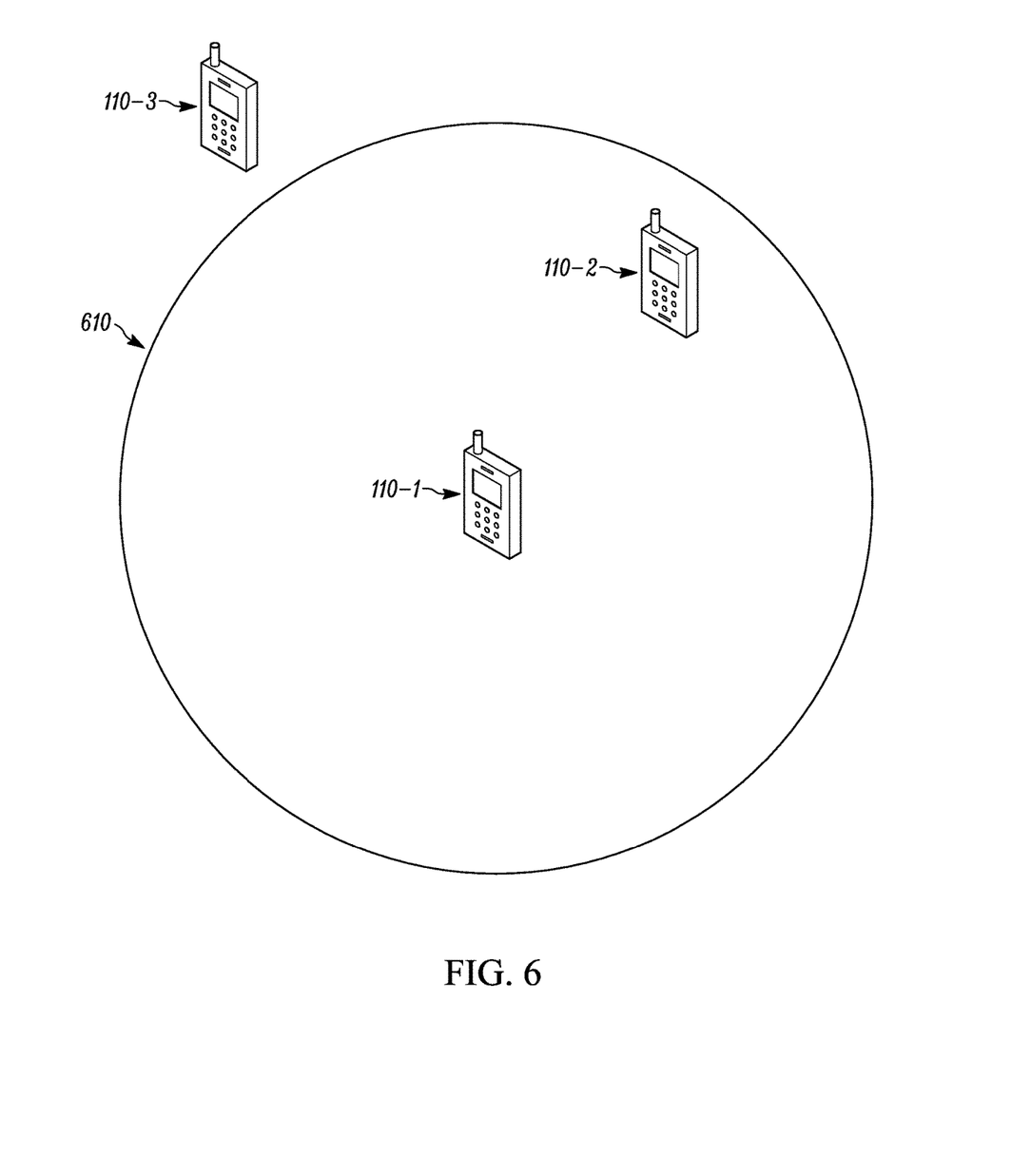
FIG. 6 is a schematic diagram indicating the relative locations of the communications devices used in the PTT system of FIG. 1 in accordance with some embodiments.

When no proximity alerts are generated, method 500 continues to check proximity at 510. In this example, Referring to FIG. 6, a proximity threshold is indicated by the line 610. Moreover, in this example, the three communication devices 110 are engaged in a multi-cast system and thus, the communication devices 110-2 and 110-3 are in receive-mode. Accordingly, as indicated by the relative location of the communication devices 110, the communication devices 110-2 and 110-1 are within the proximity threshold indicated at 610. Accordingly, a proximity alert is generated and the method 500 advances to 520.

Continuing with method 500, at 520, a feedback reduction operation is enabled. In this example, the feedback reduction operation may be a lowering of the playback volume at the communication devices 110-1 and/or 110-2 and/or a delaying of a playback at the communication devices 110-1 and/or 110-2, or a combination as described above.

Once the feedback reduction is enabled at 520, At 525 a proximity check is once again performed. The proximity check may be performed by a proximity monitor maintained by the communication devices 110. In some implementations, the proximity check may be made by each receive-mode communication device 110 checking to determine whether a transmit-mode communication device 110 is within a proximity threshold. Alternatively, or in addition, a transmit-mode communication device 110 may check to determine whether any of the receive-mode communication devices 110 are within a proximity threshold.

The check may be performed periodically, or in any other manner deemed appropriate, for example, when a device is determined to be in motion. In this example, the proximity check is performed based on the Bluetooth LE proximity profiles maintained by each communication device 110.

At 530 a determination is made as to whether a proximity alert no longer exists based on the proximity check. The proximity alert may be generated by the proximity monitor maintained by the communication devices 110. For example provision of a proximity alert may end when, based on the proximity check, a transmit and a receive-mode communication devices 110 are determined to no longer cross a predetermined proximity threshold.

Figure 7:
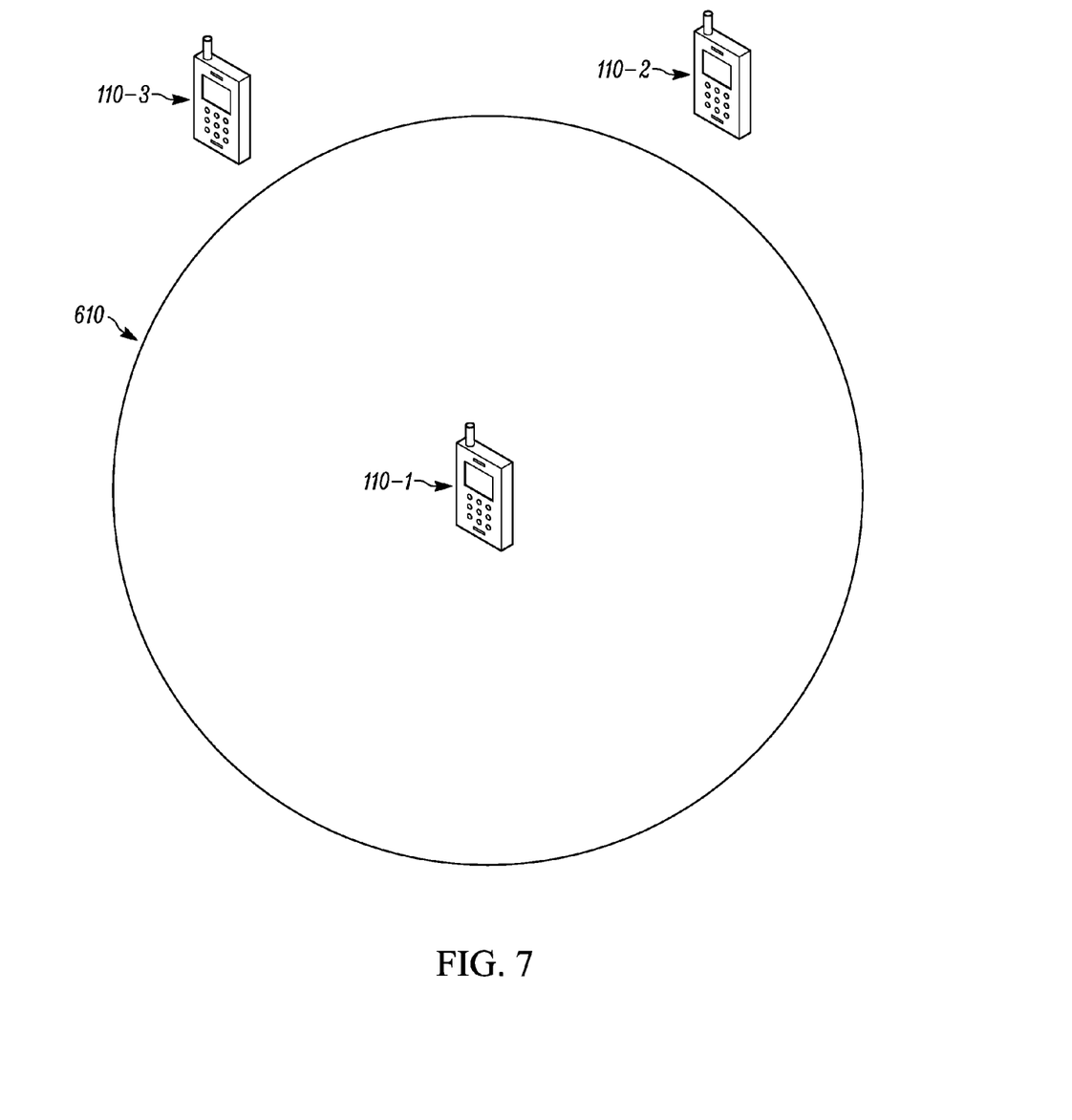
FIG. 7 is a schematic diagram indicating the relative locations of the communications devices used in the PTT system of FIG. 1 in accordance with some embodiments.

When a proximity alert continues to be generated, the method 500 advances to 525 and continues to monitor proximity. When, on the other hand, the communication devices 110-1 and 110-2 move away from each other such that they no longer cross a proximity threshold, as shown in FIG. 7, the alert generation is ended. Accordingly, the method 500 advances to 535.

At 535, the feedback reduction operation or operations are disabled. Since the two communication devices 110-1 and 110-2 are no longer sufficiently close enough to cause feedback, the feedback reduction operations may accordingly be suspended.

The method 500 advances to 540 where a check is performed to determine whether the transmit-mode communication device 110-1 continues to be in the transmit-mode. For example, a check may be made to determine whether the transmit-mode device continues to transmit by continuing to engage the PTT button. If so, the method advances back to 510 to await a further proximity alert. If not, the method ends, since none of the devices are transmitting, and hence feedback reduction operations do not have to be performed. In this example, the PTT button of the communication device 110-1 is released, ending method 500.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method of feedback reduction among mobile devices operating in half-duplex communications, the method comprising:
   entering a transmit-mode at a first mobile device;
   receiving a voice input from an audio input apparatus at the first mobile device;
   determining a crossing of a proximity threshold between the first mobile device and a second mobile device; and
   enabling a feedback reduction operation based on the determination, wherein the feedback reduction operation includes delaying a playback of the voice input at the second mobile device until the first mobile device exits the transmit-mode.

2. The method of claim 1 wherein the determining is based on a proximity check based on a near field proximity profile.

3. The method of claim 1 wherein the feedback reduction operation further includes reducing a playback volume to a predetermined level.

4. The method of claim 3 wherein the reducing the playback volume further comprises at least one of:
   reducing a sensitivity of audio input apparatus to a predetermined level, and
   processing the voice input to reduce the playback volume at the second mobile device to the predetermined level.

5. The method of claim 1 wherein the delaying the playback further comprises:
   buffering the voice input at the first mobile device.

6. The method of claim 3 wherein the reducing the playback volume further comprises at least one of:
   reducing a volume of the audio output apparatus to a predetermined level, and
   processing an encoded voice input to reduce the playback volume of the voice input to the predetermined level.

7. The method of claim 1 wherein:
   the proximity threshold further comprises a first proximity threshold and a second proximity threshold,
   the determining of the crossing of the threshold comprises determining the crossing of one of the first or the second threshold, and
   the feedback reduction operation enabled for crossing the first threshold is different from the feedback reduction operation performed for crossing the second proximity threshold.

8. The method of claim 1 further comprising:
   determining an end to the crossing of the proximity threshold between the first device and the second device; and
   disabling the feedback reduction operation based on the determination of the end.

9. The method of claim 1 further comprising:
   providing an indication that the feedback reduction operation is enabled.

10. A first mobile device operating in half-duplex communications comprising:
    a processor operating to:
       enter the first mobile device into a transmit-mode;
       receive a voice input from an audio input apparatus; and
       determine a crossing of a proximity threshold between the first mobile device and a second mobile device;
       wherein the second mobile device is configured to enable a feedback reduction operation based on the determination, the feedback reduction operation including delaying a playback of the voice input until the first mobile device exits the transmit-mode.

11. The first device of claim 10 wherein the determining is based on a proximity check based on a near field proximity profile.

12. The first device of claim 10 wherein the feedback reduction operation is the processor further operating to perform reducing a playback volume to a predetermined level.

13. The first device of claim 10 wherein the delaying the playback further comprises:
buffering the voice input at the first mobile device.

14. The first device of claim 12, further comprising:
a communication interface operating to receive a voice input from the second mobile device,
the processor further operating to:
enter the first mobile device into a receive-mode; and
output the voice input from the second mobile device at an audio output apparatus.

15. The first device of claim 14 wherein the reducing the playback volume further comprises at least one of:
the processor further operating to reduce a volume of the audio output apparatus to a predetermined level, and
the processor further operating to process an encoded voice input to reduce the playback volume of the voice input to the predetermined level.

16. The first device of claim 14 wherein the delaying the playback further comprises:
the processor further operating to delay the outputting of the voice input until the second device exits a transmit-mode.

* * * * *